March 28, 1961   J. F. MARCH   2,976,612
CUTTING IMPLEMENT
Filed April 10, 1959
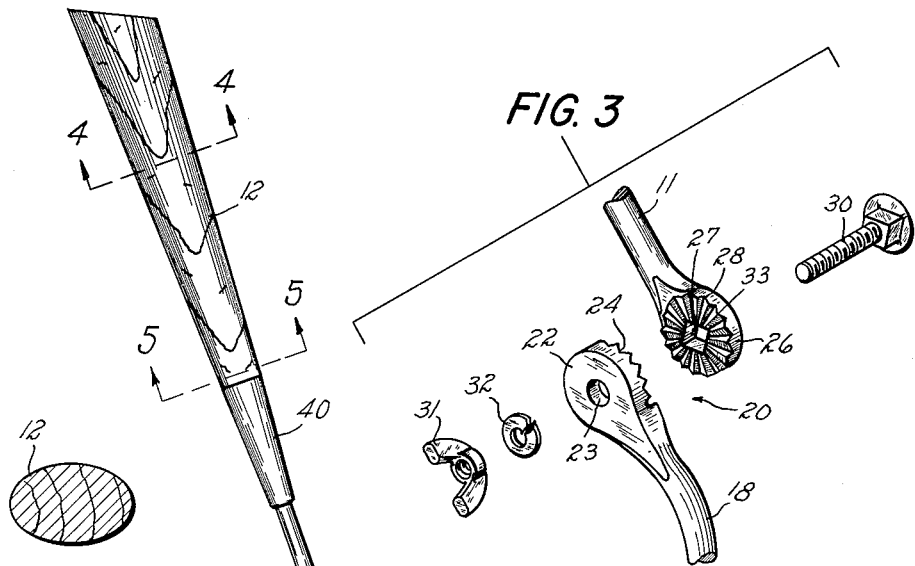
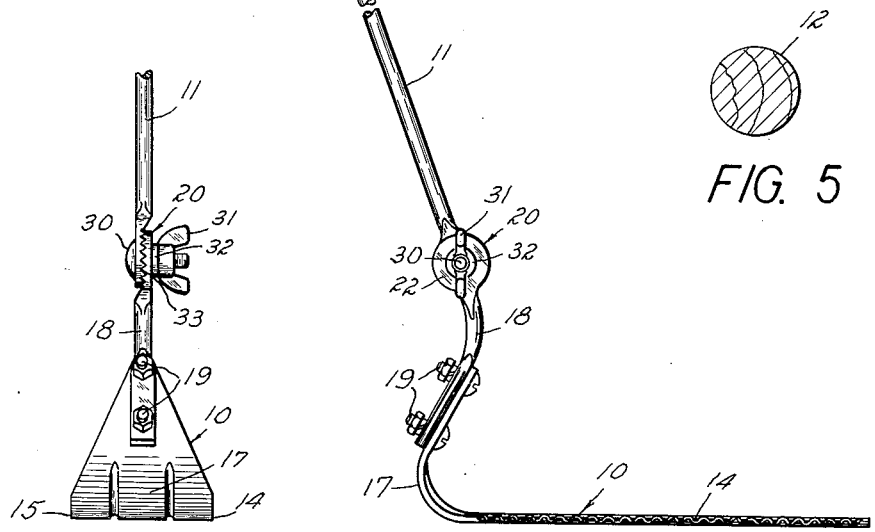
INVENTOR.
JOSEPH F. MARCH
BY
Lindsey and Prutzman
ATTORNEYS

United States Patent Office 2,976,612
Patented Mar. 28, 1961

2,976,612

CUTTING IMPLEMENT

Joseph F. March, Waterbury, Conn., assignor to The Stanley Works, New Britain, Conn., a corporation of Connecticut Filed Apr. 10, 1959, Ser. No. 805,525

2 Claims. (Cl. 30—318)

This invention relates to an improved cutting implement which is manually swung in an arcuate path to cut weeds and the like.

It is an object of this invention to provide an improved weed cutter which is adjustable to facilitate operation by persons of different heights thereby to greatly improve the user's comfort and the over-all efficiency of the weed cutter.

It is an additional object of this invention to provide an improved weed cutter which easily trims evergreens, bushes and banks of grass as well as weeds and grass which grow in a horizontal plane.

It is a further object of this invention to provide an improved weed cutter which reduces the twisting shock on the hand and wrist of the user.

It is a still further object of this invention to provide a cutting implement which is comfortable to use, economical to manufacture and susceptible of use in a wide variety of applications.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

In the drawings:

Fig. 1 is a side elevation view of a preferred embodiment of this invention;

Fig. 2 is a partial rear view of the embodiment of Fig. 1;

Fig. 3 is a partial exploded perspective view of the embodiment of Fig. 1;

Fig. 4 is a cross section view taken along the lines 4—4 of Fig. 1; and

Fig. 5 is a cross section view taken along the lines 5—5 of Fig. 1.

The cutting implement of this invention generally comprises a cutting blade 10, a shaft 11 affixed to the cutting blades at one end and having a handle 12 affixed at its other end. Cutting blade 10 is provided with cutting edges 14 and 15 along opposite longitudinal edges so that grasping handle 12 and swinging blade 10 so as to permit swinging of the cutting edges 14 and 15 in an arcuate path cuts weeds and the like in both arcuate directions. Although blade 10 is illustrated as a serrated blade, it is to be understood that a scythe or other type blade can also be effectively utilized with my invention.

As is apparent from the foregoing brief description of use, the height of the user's hand above the ground must closely coincide with the distance of handle 12 from blade 10 if the cutting implement is to be efficiently and comfortably used with minimum possibility of digging up turf, inadvertent cutting of flowers, etc. To insure such comfortable and efficient use, my improved cutting implement includes an adjustable joint 20 disposed adjacent the bottom end of shaft 11 to effect adjustment of the vertical distance and angular relationship between blade 10 and handle 12. Blade 10 is provided with an upwardly and forwardly bent heel 17 to which is fastened shank 18 by threaded fasteners 19. As most clearly seen in Fig. 3, the free end of shank 18 is flattened to provide a generally circular end 22 having a central aperture 23 and a plurality of radially extending grooves 24 along one face thereof. In a similar manner, shaft 11 is provided with flattened generally circular end 26 having a central aperture 27 and a plurality of radial grooves 28 along one face thereof. Aperture 27 is square in cross section to accept the square shoulder of stove bolt 30 and a wing nut 31 and lock washer 32 engage the other end of stove bolt 30 when it is passed through apertures 23 and 27. As is apparent, turning of wing nut 31 onto fastener 30 will bring the teeth 33 defined by alternate grooves on end 26 into engagement with the grooves 24 in end 22 thereby to firmly lock shaft 11 and shank 18 together. Because of the symmetry of the formation of the grooves in ends 22 and 26, a plurality of easily adjustable rotated positions can be obtained merely by loosening wing nut 31, pivoting the handle relative to the shank to the desired position, and tightening wing nut 31 to lock the elements in the desired position. It is noted that the axis of pivoting of shaft 11 relative to shank 18 and blade 10 is arranged so as to be transverse to the length of the cutting edges 14 and 15. Thus, the effective height of handle 12 from blade 10 can be easily adjusted so as to accommodate different heights of users.

An added advantage obtained by the aforedescribed adjusting feature relates to the provision of greatly increased versatility for my improved cutting tool. Under normal conditions, where the angle of the handle relative to the cutting blade is fixed, it is very difficult to trim grass and weeds on sloping ground and virtually impossible to use the cutting implement for anything but the trimming of weeds, shubbery, etc., which are to be trimmed along a substantially horizontal plane. However, by adjusting the pivotal position of blade 10 relative to shaft 11 until it is substantially parallel thereto, it is possible to trim shrubs, trees, etc. along a line which is other than horizontal. By adjustment of the blade to an intermediate position between the normal and parallel positions, all types of terrains and trimming jobs can be easily accommodated.

As is apparent from an analysis of the forces exerted upon blade 10 during a cutting sweep, a substantial twisting moment is applied to shaft 11 and handle 12 by weeds, etc. which contact the blade at its outer end and such moments are at their greatest magnitude when the shaft 11 is adjusted so as to be substantially perpendicular to the plane of the cutting edges 14 and 15. In order to further increase the comfort and efficiency of use of my improved grass cutting implement, I have provided a handle 12 which has a generally circular cross section adjacent the ferrule 40 (see Fig. 5) and which increases in cross-sectional area and changes in shape to that of an oval at the upper end (see Fig. 4). The handle is positioned so that the major axis of the oval lies in a plane substantially perpendicular to the axis of pivotal adjustment of blade 10 relative to shaft 11 and the minor axis lies in the direction of swinging movement of the tool. Thus, not only does the change of shape from circular cross section to oval cross section conform to the normal closed hand gripping position, but the orientation of the oval is such as to provide maximum gripping resistance to the aforementioned twisting moments so as to greatly reduce shock upon the hand and wrist of the user and to substantially increase the efficiency of operation of my improved grass cutting implement. It is noted that the handle 12 can be made of a wood such as white ash that is pinned to the shaft 11 in any desired manner so as to position the major axis of the oval in the aforementioned perpendicular plane relative to the axis of rotation of the blade relative thereto.

It is therefore seen that I have provided an improved grass cutting implement that is exceptionally sturdy, economical to manufacture, easily repaired, and having a blade which is easily removed for sharpening or replacement. In addition, my improved grass cutting implement is easily adjustable to different heights of users and can be utilized to trim a great variety of objects along a line other than horizontal. Further, the shaft and handle can be removed to permit use of the shank and blade as a hand sickle in restricted spaces.

As will be apparent to persons skilled in the art, various modifications and adaptations of the structure above described will become readily apparent without departure from the spirit and scope of the invention, the scope of which is defined in the appended claims.

I claim:

1. A cutting implement of the type manually swung in an arcuate path to cut weeds and the like comprising an elongated cutting blade having cutting edges on opposite sides thereof, said blade having an upwardly and forwardly bent heel portion; a shank secured to said heel portion and extending upwardly therefrom, the upper portion thereof extending rearwardly and upwardly of the heel and terminating in a centrally apertured flat circular end spaced substantially upwardly from the plane defined by the cutting edges at a distance greater than one-half the length of said cutting edges, said flat end having one surface provided with a plurality of radially extending grooves and having the axis of its aperture extending transversely of said blade, the axis of the rearwardly extending upper portion of the shank intersecting the blade at a point rearwardly of the center thereof and at an acute angle thereto; an elongated shaft having a centrally apertured flat end overlying said flat end of the shank with the apertures in registry, the overlying surface of the flat end of the shaft having radial grooves cooperating with the radial grooves in the flat end of the shank for firm interlocking engagement in a plurality of angular positions; a handle secured to the other end of the shaft; and bolt and nut means extending through said apertures and clamping the grooved surfaces of the flattened ends together in firm interlocking engagement, said means being releasable to permit relative rotation of said flattened ends about an axis extending transversely of the blade to orient said shaft and handle at a plurality of angular positions with respect to the blade for adjustment of the implement to the height of the user and to vary the cutting angle, said handle being displaced substantially upwardly from the plane defined by the cutting edges when the axis of the handle is substantially parallel to the plane of the cutting edges to enable cutting movement close to the ground and obstructions without risk of injury to the hand of the user.

2. A cutting implement of the type manually swung in an arcuate path to cut weeds and the like comprising an elongated cutting blade having cutting edges on opposite sides thereof, said blade having an upwardly and forwardly bent heel portion; a reversely bent shank secured to said heel portion and extending upwardly and rearwardly of said heel portion, the upper end of said shank terminating in a centrally apertured flat circular end spaced substantially upwardly from the plane defined by the cutting edges at a distance greater than one-half the length of said cutting edges, said flat end having one surface provided with a plurality of radially extending grooves and having the axis of its aperture extending transversely of said blade, the axis of the rearwardly extending shank intersecting the blade at a point rearwardly of the center thereof and at an acute angle thereto; an elongated shaft having a centrally apertured flat end overlying said flat end of the shank with the apertures in registry, the overlying surface of the flat end having radial grooves cooperating with the radial grooves in the flat end of the shank for firm interlocking engagement of the shaft in a plurality of angular positions; a handle secured to the other end of the shaft, said handle having an oval cross-section at its upper end and throughout the major portion of its length, said oval cross-section tapering to a circular cross-section of reduced area at its lower end, the major axis of the oval cross-section extending longitudinally of the blade and generally perpendicular to the direction of swinging movement, the minor axis extending transversely of the blade and in the direction of swinging movement; and fastener means seated in said apertures and clamping the opposed groove surfaces of the flattened ends together in firm engagement, said fastener means being releasable to permit relative rotation of said flattened ends about an axis extending transversely of the cutting edges to orient said shaft and handle at a plurality of angular positions with respect to the cutting edges for adjustment of the implement to the height of the user and to vary the cutting angle, said handle being displaced substantially upwardly from the plane defined by the cutting edges when the axis of the handle is substantially parallel to the plane of the cutting edges to enable cutting movement close to the ground and obstructions without risk of injury to the hand of the user, said implement being characterized by substantial freedom from twisting movement by minimal shock to the hand when an obstruction is struck by the blade.

References Cited in the file of this patent

UNITED STATES PATENTS

| | | |
|---|---|---|
| 914,947 | Hammerly | Mar. 9, 1909 |
| 982,674 | Hibbler | Jan. 24, 1911 |
| 1,625,081 | Haas | Apr. 19, 1927 |
| 2,787,058 | Vogel | Apr. 2, 1957 |

FOREIGN PATENTS

| | | |
|---|---|---|
| 584,192 | Great Britain | Jan. 9, 1947 |